Patented Jan. 5, 1954

2,665,268

UNITED STATES PATENT OFFICE 2,665,268

VULCANIZATION OF RUBBER

John Mann Butler, Centerville, Ohio, assignor to Monsanto Chemical Company, St. Louis, Mo., a corporation of Delaware No Drawing. Application April 26, 1952, Serial No. 284,643

15 Claims. (Cl. 260—79.5)

This invention relates to new rubber formulations wherein the novel class of (tert-alkylmercapto)-zinc N,N-dialkyl dithiocarbamates are employed as rubber vulcanization accelerators and to the process of vulcanizing a sulfur-vulcanizable rubber with the aforesaid accelerators.

The zinc dithiocarbamates comprise a well-known class of accelerators of high activity having the general formula:

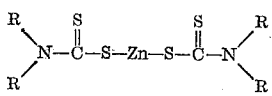

wherein the R groups represent various monovalent organic radicals and the two R groups bonded to the same nitrogen atom can also be taken together to represent a divalent organic radical.

It has now been found that the novel compounds having the illustrative formula:

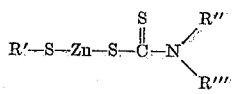

wherein R' represents a tert-alkyl radical containing up to 16 carbon atoms and R'' and R''' represent an alkyl radical containing up to 8 carbon atoms, have unexpectedly improved properties over the prior art conventional zinc dithiocarbamates.

The novel class of rubber vulcanization accelerators disclosed herein are applicable to natural rubber and to various synthetic rubbers which can be generically described as sulfur-vulcanizable organic plastic substances which contain unsaturated carbon to carbon bonds. Illustrative natural rubbers are, for example, gutta-percha, latex, balata, caoutchouc and the like. Illustrative synthetic rubbers are, for example, polymers of conjugated diene hydrocarbons and copolymers thereof with other copolymerizable monomers such as copolymers of butadiene with styrene (GR–S), acrylonitrile (GR–A), isobutylene (GR–I), methyl methacrylate, methyl acrylate, and the like.

The following (tert-alkylmercapto)-zinc N,N-dialkyl dithiocarbamates are illustrative of the novel sulfur-vulcanizable rubber accelerators of this invention:

(Tert-dodecylmercapto)-zinc N,N-dibutyl dithiocarbamate,
(Tert-octylmercapto)-zinc N,N-dibutyl dithiocarbamate,
(Tert-dodecylmercapto)-zinc N,N-dimethyl dithiocarbamate,
(Tert-hexadecylmercapto)-zinc N,N-dioctyl dithiocarbamate,
(Tert-octylmercapto)-zinc N,N-dimethyl dithiocarbamate,
(Tert-decylmercapto)-zinc N,N-diisopropyl dithiocarbamate,
(Tert-tetradecylmercapto)-zinc N,N-diethyl dithiocarbamate,
(Tert-dodecylmercapto) - zinc N,N - diethyl dithiocarbamate,
(Tert-octylmercapto)-zinc N,N-diphenyl dithiocarbamate,
(Tert-butylmercapto)-zinc N,N-dimethyl dithiocarbamate,
(Tert-butylmercapto)-zinc N,N-dibutyl dithiocarbamate,
(Tert-butylmercapto)-zinc N,N-dioctyl dithiocarbamate,
(Tert-heptylmercapto)-zinc N,N-dimethyl dithiocarbamate,
(Tert-dodecylmercapto) - zinc N-ethyl-N-heptyl dithiocarbamate,
(Tert-octylmercapto)-zinc N-ethyl-N-methyl dithiocarbamate, and the like.

The following example is illustrative of this invention:

The activity of the accelerators was tested by preparing a rubber base formulation having the following composition, parts being by weight.

Rubber as 60% Hevea latex _____ 100.0
Zinc oxide _____ 1.0
Sulfur _____ 1.5
Accelerator _____ 0.5

The zinc oxide, sulfur and zinc dibutyl dithiocarbamate accelerator were employed as about 50 per cent water dispersions. The (tert-dodecylmercapto)-zinc dibutyl dithiocarbamate is a water-insoluble, viscous oil and cannot be dispersed in water in a stable form by the general milling techniques; thus this accelerator was employed as a 50 per cent water emulsion. The above water dispersed additives were added with mild agitation and mixed until uniform, care being taken to prevent the formation of bubbles.

The latex sheeets were cured in a current of hot air at 100° C. and the stress-strain data determined with the following results:

| Accelerator | Minutes Cure at 100° C. | Ultimate Tensile Strength, p. s. i. | Ultimate Elongation, percent |
|---|---|---|---|
| Zinc dibutyl dithiocarbamate | 10 | 3,260 | 660 |
| | 20 | 3,210 | 645 |
| | 30 | 3,113 | 633 |
| | 60 | 3,380 | 650 |
| (Tert-dodecylmercapto)-zinc dibutyl dithiocarbamate | 10 | 4,570 | 800 |
| | 20 | 4,335 | 790 |
| | 30 | 4,715 | 815 |
| | 60 | 4,605 | 800 |

The above formulation can be modified by the addition of a protective colloid such as about 1 part by weight of a 10 per cent solution of ammonium caseinate, other vulcanization accelerators, small quantities of wetting agents, etc. Generally the accelerators of this invention are employed in amounts of from about 0.1 to about 2.0 or more parts by weight per 100 parts by weight of the rubber base.

The degree of heat necessary to cure the rubber formulation can vary over a wide range. The stock can be cured at room temperature, if desired, but such processes normally require several days. Generally the formulation is heated at from about 50 to about 150° C. or higher and preferably from about 100 to about 120° C. for a time sufficient to effect the desired vulcanization. The time and temperature are dependent on the particular formulation being employed and can be readily determined by those skilled in the art to provide properly vulcanized products and avoid scorching and overcure by too drastic temperature or time conditions.

The ultra-accelerators of this invention are particularly useful in latex formulations to prepare baloon stock, latex sponge stock, and the like. However they can also be employed in dry rubber mixes and are particularly useful in the vulcanization of large masses of rubber wherein the accelerator's wide workable latitude in the characteristic known as the plateau effect provides a uniformly cured product. The herein disclosed ultra-accelerators are also effective as secondary accelerators for employment with a slower primary accelerator which compositions generally have a much more rapid rate of cure than compositions employing only the primary accelerator and provide improved products.

The novel rubber accelerator compounds disclosed herein and the process of producing them are described and claimed in my copending application, Serial No. 284,641, filed April 26, 1952.

I claim:

1. A process of curing a sulfur-vulcanizable rubber which comprises heating the rubber having incorporated therein a minor amount of a (tert-alkylmercapto)-zinc N,N-dialkyl dithiocarbamate accelerator having the formula:

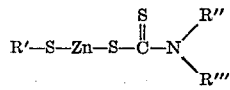

wherein R' represents a tert-alkyl radical containing up to 16 carbon atoms and R" and R''' represent an alkyl radical containing up to 8 carbon atoms.

2. The process of claim 1 wherein the accelerator is employed in an amount of from about 0.1 to about 2.0 parts by weight per 100 parts by weight of the rubber base and the temperature is from about 50 to about 150° C.

3. The process of claim 2 wherein the temperature is from about 100 to about 120° C.

4. The process of claim 3 wherein the accelerator is (tert-dodecylmercapto)-zinc N,N-dibutyl dithiocarbamate.

5. The process of claim 3 wherein the accelerator is (tert-dodecylmercapto)-zinc N,N-dimethyl dithiocarbamate.

6. The process of claim 3 wherein the accelerator is (tert-dodecylmercapto)-zinc N,N-diethyl dithiocarbamate.

7. The process of claim 3 wherein the accelerator is (tert-octylmercapto)-zinc N,N-dibutyl dithiocarbamate.

8. The process of claim 3 wherein the accelerator is (tert-octylmercapto)-zinc N,N-dimethyl dithiocarbamate.

9. A sulfur-vulcanizable rubber product which has been vulcanized in the presence of a minor amount of a (tert-alkylmercapto)-zinc N,N-dialkyl dithiocarbamate accelerator having the formula:

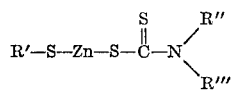

wherein R' represents a tert-alkyl radical containing up to 16 carbon atoms and R" and R''' represent an alkyl radical containing up to 8 carbon atoms.

10. The rubber product of claim 9 wherein the accelerator is in an amount of from about 0.1 to about 2.0 parts by weight per 100 parts by weight of the rubber base.

11. The rubber product of claim 10 wherein the accelerator is (tert-dodecylmercapto)-zinc N,N-dibutyl dithiocarbamate.

12. The rubber product of claim 10 wherein the accelerator is (tert-dodecylmercapto)-zinc N,N-dimethyl dithiocarbamate.

13. The rubber product of claim 10 wherein the accelerator is (tert-dodecylmercapto)-zinc N,N-diethyl dithiocarbamate.

14. The rubber product of claim 10 wherein the accelerator is (tert-octylmercapto)-zinc N'N-dibutyl dithiocarbamate.

15. The rubber product of claim 10 wherein the accelerator is (tert-octylmercapto)-zinc N,N-dimethyl dithiocarbamate.

JOHN MANN BUTLER.

No references cited.